United States Patent
Girouard et al.

(10) Patent No.: US 8,495,694 B2
(45) Date of Patent: *Jul. 23, 2013

(54) VIDEO-ENABLED COMMUNITY BUILDING

(75) Inventors: David Girouard, San Francisco, CA (US); Bradley Horowitz, San Mateo, CA (US); Richard Humphrey, San Mateo, CA (US); Charles Fuller, Foster City, CA (US)

(73) Assignee: Virage, Inc., San Mateo, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/106,283

(22) Filed: May 12, 2011

(65) Prior Publication Data

US 2011/0214144 A1    Sep. 1, 2011

Related U.S. Application Data

(63) Continuation of application No. 09/828,618, filed on Apr. 6, 2001, now Pat. No. 7,962,948.

(60) Provisional application No. 60/195,728, filed on Apr. 7, 2000.

(51) Int. Cl.
*H04N 7/173* (2011.01)

(52) U.S. Cl.
USPC ............... 725/115; 725/86; 725/91; 725/105; 725/110

(58) Field of Classification Search
USPC ............... 725/86, 91, 105, 110, 115
See application file for complete search history.

(56) References Cited

U.S. PATENT DOCUMENTS

| | | | |
|---|---|---|---|
| 4,115,805 | A | 9/1978 | Morton |
| 4,334,241 | A | 6/1982 | Kashioka et al. |
| 4,574,319 | A | 3/1986 | Konishi |
| 5,027,400 | A | 6/1991 | Baji et al. |
| 5,045,940 | A | 9/1991 | Peters et al. |
| 5,136,655 | A | 8/1992 | Bronson |
| 5,307,456 | A | 4/1994 | MacKay |
| 5,335,072 | A | 8/1994 | Tanaka et al. |
| 5,414,808 | A | 5/1995 | Williams |
| 5,446,919 | A | 8/1995 | Wilkins |
| 5,467,288 | A | 11/1995 | Fasciano et al. |
| 5,481,296 | A | 1/1996 | Cragun et al. |
| 5,485,553 | A | 1/1996 | Kovalick et al. |
| 5,506,644 | A | 4/1996 | Suzuki et al. |

(Continued)

FOREIGN PATENT DOCUMENTS

| | | |
|---|---|---|
| EP | 545727 A2 | 6/1993 |
| WO | WO 92 22983 | 12/1992 |
| WO | WO 96 12239 | 4/1996 |
| WO | WO 97 26758 | 7/1997 |

OTHER PUBLICATIONS

"How Flashpix Works", 1996, printed from http://www.digitalimaging.org/flashpix howitworks.html on Oct. 6, 1998(2 pages).

(Continued)

*Primary Examiner* — Dominic D Saltarelli

(57) ABSTRACT

A system and method that provide media content owners the capability to achieve community building goals by exploiting video processing capabilities using rich, interactive and compelling media content on a network or Internet website. The system and method additionally provide website community building mechanisms to community members, thereby allowing the members to customize the actual community websites that many companies and website owners seek in order to enhance e-commerce revenue generation.

28 Claims, 9 Drawing Sheets

U.S. PATENT DOCUMENTS

| | | |
|---|---|---|
| 5,508,940 A | 4/1996 | Rossmere et al. |
| 5,521,841 A | 5/1996 | Arman et al. |
| 5,551,016 A | 8/1996 | Loeb et al. |
| 5,557,320 A | 9/1996 | Krebs |
| 5,561,457 A | 10/1996 | Cragun et al. |
| 5,566,290 A | 10/1996 | Silverbrook |
| 5,568,328 A | 10/1996 | Takahashi et al. |
| 5,574,845 A | 11/1996 | Benson et al. |
| 5,606,655 A | 2/1997 | Arman et al. |
| 5,613,032 A | 3/1997 | Cruz et al. |
| 5,633,678 A | 5/1997 | Parulski et al. |
| 5,642,285 A | 6/1997 | Woo et al. |
| 5,649,060 A | 7/1997 | Ellozy et al. |
| 5,655,117 A | 8/1997 | Goldberg et al. |
| 5,657,077 A | 8/1997 | DeAngelis et al. |
| 5,664,218 A | 9/1997 | Kim et al. |
| 5,664,227 A | 9/1997 | Mauldin et al. |
| 5,677,994 A | 10/1997 | Miyamori et al. |
| 5,680,639 A | 10/1997 | Milne et al. |
| 5,682,458 A | 10/1997 | Funazaki |
| 5,692,104 A | 11/1997 | Chow et al. |
| 5,701,153 A | 12/1997 | Reichek et al. |
| 5,706,290 A | 1/1998 | Shaw et al. |
| 5,706,457 A | 1/1998 | Dwyer et al. |
| 5,732,219 A | 3/1998 | Blumer et al. |
| 5,740,388 A | 4/1998 | Hunt |
| 5,745,637 A | 4/1998 | Phillips et al. |
| 5,751,280 A | 5/1998 | Abbott et al. |
| 5,767,893 A | 6/1998 | Chen et al. |
| 5,774,170 A | 6/1998 | Hite et al. |
| 5,774,664 A | 6/1998 | Hidary et al. |
| 5,777,612 A | 7/1998 | Kataoka |
| 5,778,181 A | 7/1998 | Hidary et al. |
| 5,794,249 A | 8/1998 | Orsolini et al. |
| 5,796,428 A | 8/1998 | Matsumoto et al. |
| 5,809,512 A | 9/1998 | Kato |
| 5,813,014 A | 9/1998 | Gustman |
| 5,815,201 A | 9/1998 | Hashimoto et al. |
| 5,818,512 A | 10/1998 | Fuller |
| 5,822,024 A | 10/1998 | Setogawa et al. |
| 5,822,537 A | 10/1998 | Katseff et al. |
| 5,826,102 A | 10/1998 | Escobar et al. |
| 5,828,809 A | 10/1998 | Chang et al. |
| 5,835,667 A | 11/1998 | Wactlar et al. |
| 5,838,314 A | 11/1998 | Neel et al. |
| 5,852,435 A | 12/1998 | Vigneaux et al. |
| 5,861,881 A | 1/1999 | Freeman et al. |
| 5,864,823 A | 1/1999 | Levitan |
| 5,870,754 A | 2/1999 | Dimitrova et al. |
| 5,872,565 A | 2/1999 | Greaves et al. |
| 5,872,865 A | 2/1999 | Normile et al. |
| 5,884,056 A | 3/1999 | Steele |
| 5,889,578 A | 3/1999 | Jamzadeh |
| 5,890,175 A | 3/1999 | Wong et al. |
| 5,893,095 A | 4/1999 | Jain et al. |
| 5,898,441 A | 4/1999 | Flurry |
| 5,903,261 A | 5/1999 | Walsh et al. |
| 5,903,892 A | 5/1999 | Hoffert et al. |
| 5,911,139 A | 6/1999 | Jain et al. |
| 5,913,205 A | 6/1999 | Jain et al. |
| 5,915,250 A | 6/1999 | Jain et al. |
| 5,917,958 A | 6/1999 | Nunally et al. |
| 5,918,012 A | 6/1999 | Astiz et al. |
| 5,920,856 A | 7/1999 | Syeda-Mahmood |
| 5,926,205 A | 7/1999 | Krause et al. |
| 5,930,446 A | 7/1999 | Kanda |
| 5,946,445 A | 8/1999 | Peters et al. |
| 5,953,005 A | 9/1999 | Liu |
| 5,963,702 A | 10/1999 | Yamashita |
| 5,969,716 A | 10/1999 | Davis et al. |
| 5,969,772 A | 10/1999 | Saeki |
| 5,974,572 A | 10/1999 | Weinberg et al. |
| 5,977,964 A | 11/1999 | Williams et al. |
| 5,982,979 A | 11/1999 | Omata et al. |
| 5,983,176 A | 11/1999 | Hoffert et al. |
| 5,983,237 A | 11/1999 | Jain et al. |
| 5,987,454 A | 11/1999 | Hobbs |
| 5,987,509 A | 11/1999 | Portuesi |
| 5,990,955 A | 11/1999 | Koz |
| 6,006,241 A | 12/1999 | Pumaveja et al. |
| 6,006,257 A | 12/1999 | Siezak |
| 6,006,265 A | 12/1999 | Rangan et al. |
| 6,009,410 A | 12/1999 | LeMole et al. |
| 6,009,507 A | 12/1999 | Brooks et al. |
| 6,014,183 A | 1/2000 | Hoang |
| 6,014,693 A | 1/2000 | Ito et al. |
| 6,018,768 A | 1/2000 | Ullman et al. |
| 6,034,942 A | 3/2000 | Yoshio et al. |
| 6,061,056 A | 5/2000 | Menard et al. |
| 6,065,050 A | 5/2000 | DeMoney |
| 6,084,595 A | 7/2000 | Bach et al. |
| 6,094,671 A | 7/2000 | Chase et al. |
| 6,112,226 A | 8/2000 | Weaver et al. |
| 6,115,717 A | 9/2000 | Mehrotra et al. |
| 6,119,154 A | 9/2000 | Weaver et al. |
| 6,134,243 A | 10/2000 | Jones et al. |
| 6,154,771 A | 11/2000 | Rangan et al. |
| 6,167,404 A | 12/2000 | Morcos et al. |
| 6,167,427 A | 12/2000 | Rabinovich et al. |
| 6,169,573 B1 | 1/2001 | Sampath-Kumar et al. |
| 6,170,065 B1 | 1/2001 | Kobata et al. |
| 6,173,287 B1 | 1/2001 | Eberman et al. |
| 6,175,862 B1 | 1/2001 | Chen et al. |
| 6,185,527 B1 | 2/2001 | Petkovic et al. |
| 6,205,260 B1 | 3/2001 | Crinon et al. |
| 6,211,869 B1 | 4/2001 | Loveman et al. |
| 6,236,395 B1 | 5/2001 | Sezan et al. |
| 6,240,553 B1 | 5/2001 | Son et al. |
| 6,259,828 B1 | 7/2001 | Crinon et al. |
| 6,285,788 B1 | 9/2001 | Sezan et al. |
| 6,289,346 B1 | 9/2001 | Milewski et al. |
| 6,295,092 B1 | 9/2001 | Hullinger et al. |
| 6,317,885 B1 | 11/2001 | Fries |
| 6,324,338 B1 | 11/2001 | Wood et al. |
| 6,356,658 B1 | 3/2002 | Sezan et al. |
| 6,360,234 B2 | 3/2002 | Jain et al. |
| 6,363,380 B1 | 3/2002 | Dimitrova |
| 6,370,543 B2 | 4/2002 | Hoffert et al. |
| 6,389,473 B1 | 5/2002 | Carmel et al. |
| 6,415,099 B1 | 7/2002 | Berger |
| 6,457,010 B1 | 9/2002 | Eldering et al. |
| 6,462,754 B1 | 10/2002 | Chakraborty et al. |
| 6,462,778 B1 | 10/2002 | Abram et al. |
| 6,463,444 B1 | 10/2002 | Jain et al. |
| 6,470,337 B1 | 10/2002 | Nihei |
| 6,473,804 B1 | 10/2002 | Kaiser et al. |
| 6,484,148 B1 | 11/2002 | Boyd |
| 6,498,897 B1 | 12/2002 | Nelson et al. |
| 6,505,160 B1 | 1/2003 | Levy et al. |
| 6,526,215 B2 | 2/2003 | Hirai et al. |
| 6,546,185 B1 | 4/2003 | Kim et al. |
| 6,567,980 B1 | 5/2003 | Jain et al. |
| 6,606,117 B1 | 8/2003 | Windle |
| 6,640,145 B2 | 10/2003 | Hoffberg et al. |
| 6,686,970 B1 | 2/2004 | Windle |
| 6,698,020 B1 | 2/2004 | Zigmond et al. |
| 6,738,100 B2 | 5/2004 | Hampapur et al. |
| 6,760,749 B1 | 7/2004 | Dunlap et al. |
| 6,774,926 B1 | 8/2004 | Ellis et al. |
| 6,795,863 B1 | 9/2004 | Doty, Jr. |
| 6,801,576 B1 | 10/2004 | Haldeman et al. |
| 6,813,384 B1 | 11/2004 | Acharya et al. |
| 6,833,865 B1 | 12/2004 | Fuller et al. |
| 6,834,083 B1 | 12/2004 | Tahara et al. |
| 6,877,134 B1 | 4/2005 | Fuller et al. |
| 6,886,178 B1 | 4/2005 | Mao et al. |
| 7,028,071 B1 | 4/2006 | Silk et al. |
| 7,093,191 B1 | 8/2006 | Jain et al. |
| 7,209,942 B1 | 4/2007 | Hori et al. |
| 7,222,163 B1 | 5/2007 | Girouard et al. |
| 7,260,564 B1 | 8/2007 | Lynn et al. |
| 7,295,752 B1 | 11/2007 | Jain et al. |
| 7,403,224 B2 | 7/2008 | Fuller et al. |
| 7,424,677 B2 | 9/2008 | Sezan et al. |
| 7,769,827 B2 | 8/2010 | Girouard et al. |
| 7,962,948 B1 | 6/2011 | Girouard et al. |
| 8,107,015 B1 | 1/2012 | Hampapur et al. |

| | | |
|---|---|---|
| 8,171,509 B1 | 5/2012 | Girouard et al. |
| 2001/0012062 A1 | 8/2001 | Anderson |
| 2001/0014891 A1 | 8/2001 | Hoffert et al. |
| 2001/0018693 A1 | 8/2001 | Jain et al. |
| 2002/0054752 A1 | 5/2002 | Wood et al. |
| 2002/0056123 A1 | 5/2002 | Liwerant et al. |
| 2002/0191087 A1 | 12/2002 | Hashimoto et al. |
| 2002/0199194 A1 | 12/2002 | Ali |
| 2003/0078766 A1 | 4/2003 | Appelt et al. |
| 2003/0195877 A1 | 10/2003 | Ford et al. |
| 2005/0033760 A1 | 2/2005 | Fuller et al. |
| 2005/0198006 A1 | 9/2005 | Boicey et al. |
| 2005/0198677 A1 | 9/2005 | Lewis |
| 2005/0234985 A1 | 10/2005 | Gordon et al. |
| 2007/0282818 A1 | 12/2007 | Lynn et al. |
| 2007/0282819 A1 | 12/2007 | Lynn et al. |
| 2008/0028047 A1 | 1/2008 | Girouard et al. |
| 2008/0131072 A1 | 6/2008 | Chang et al. |
| 2011/0214144 A1 | 9/2011 | Girouard et al. |
| 2012/0128242 A1 | 5/2012 | Hampapur et al. |
| 2012/0215629 A1 | 8/2012 | Girouard et al. |

OTHER PUBLICATIONS

"How to make computer-ready FlashPix images", 1996, printed from http://www.flashpix.com/howtofpx/howtofpx.html on Oct. 6, 1998 (1 page).
"MPEG-7 Context and Objectives," International Organisation for Standardisation, printed from http://drogo.cselt.stet.it/mpeg/standards/mpeg-7/rnpeg-7.htm on Oct. 6, 1998 (9 pages).
"MPEG-7 Frequently Asked Questions", International Organization for Standardization, printed from httn://drogo.cselt.stet.it/mpeg/faq/faq_mpeg-7.htm on Oct. 6, 1998 (3 pages).
"NEC develops world's first professional quality digital optical disk camera", printed from http://info.nec.co.in/english/today/newsrel/9611/0701.html on Nov. 30, 1998 (2 pages).
"Overview of the MPEG-4 Standard", International Organization for Standardization, printed from htto://drogo.cselt.stet.it/mpeg/standards/mpeg-4/mpeg-4.htm on Oct. 6, 1998 (42 pages).
Frequently Asked Questions on MPEG-4 Video: International Organization for Standardization, printed from htto:/dgrogo.cselt.stet.it./mpeg/faq/faq-video.htm on Oct. 6, 1998 (7 pages).
8x8, Inc.—Chip Solutions, "Semiconductors: VCP Single Chip Video Codec and Multimedia Communications Processor," printed from http://www.8x8.com/oemchips/vcp.html on Jun. 15, 1999 (1 page).
Arman, F., Depommier, R., Hsu, Arding and Chiu, Ming-Yee, ACM Multimedia, pp. 97-103 (1994), "Content-Based Browsing of Video Sequences".
Arman, F., Hsu, A., and Chiu, M., SPIE vol. 1908, pp. 2-12, (1993), "Feature Management for Large Video Databases".
Avid Answers, Avid Technology, Inc., vol. 2, No. 6, Nov./Dec. 1995.
Avid Answers, Avid Technology, Inc., vol. 3, No. 1, Jan./Feb. 1996.
Broadcast Update, Avid Technology, Inc., vol. 1, No. 1, Oct. 1996.
Chen, et al., "Metadata for Mixed-Media Access", SIGMOD Record, vol. 23, No. 4, Dec. 1994, 8 pgs.
Editors: Non-Linear: ES7, printed from http://bpgprod.sel.sony.com/modelfeatures.bpg?cat=Editors&subcat=Non-Linear(ci)model+ES7 on Dec. 17, 1998 (2 pages).
Evans, "Computerized Analysis of Television Content: Advanced Imaging for the Social Sciences," (Nov. 1999), Advanced Imaging, p. 17-18.
Excalibur Technologies, (1998). Vienna Virginia (Brochure), "Excalibur Screening Room TM: The Intelligent Way to Reveal and Leverage Video Content".
Film and Television Update, Avid Technology, Inc., vol. 1, No. 1, Jul. 1997.
Glavitsch, et al., "Metadata for Integrating Speech Documents in a Test Retrieval System", SIGMOD Record, vol. 23, No. 4, Dec. 1994,7 pgs.
Islip Media, MediaKey Digital Video Library System Demonstration, NAB (1998) (Information Sheet) "Unlocking the Value of Video".
Kashyap, et al., "Metadata for Building the MultiMedia Patch Quilt", Multimedia Database Systems: Issues and Research Directions, 1995, www.cs.uga.edu/LSDIS, 23 pgs.
Little et al., A Digital On-Demand Video Service Supporting Content-Based Queries, 8/(1-6)/93/36.
Luther, Arch C., "Video Camera Technology", 1998, Figure 4.1.1 Signal Processing Block Diagram (3 pages total).
MultiMedia Access Corporation—Osprey-1000, printed from http://www.viewcast.com/osprey1000.html on Jun. 11, 1999 (6 pages).
Rigby, Martin, "What is a FlashPix?" 1996, printed from http://www.fiashpix.comlWhatlsfpx.html on Oct. 6, 1998 (1 page).
Rowley, Henry A., Baluja, Shumeet and Kanade, Takeo, CMU-CS-95-158R, Nov. 1995, Pittsburgh, Pennsylvania, "Human Face Detection in Visual Scenes".
Sherman, Howard, Howard Sherman Public Relations NEWS, Apr. 9, 1998 (News Release), "Ingenious Realtime Video Archival & Retrieval Solution".
Smith, Aguirre T., Davenport, G., ACM Workshop on Networking and Operating System Support for Digital Audio and Video (1992), San Diego, California, pp. 250-261, "The Stratification System: A Design Environment for Random Access Video".
Smith, Aguirre T., MIT MS Thesis (1992),"If You Could See What I Mean . . . ".
Smith, Aguirre T., Multimedia—For Now & the Future, Summer Proceedings, USENIX Technical Conference and Exhibition (1991), DD. 157-168, "Parsing Movies in Context".
Smith, Michael A. and Kanade, Takeo, CMU-CS-95-186, Jul. 30, 1995, Pittsburgh, Pennsylvania, "Video Skimming for Quick Browsing Based on Audio and Image Characterization".
The Content Group, Content Watch, vol. 1 No. 5. pp. 20-22, (1998), "Islip Media Delivers Advanced Tools for Video Indexing and Retrieval".
The Content Group, Content Watch, vol. 1 No. 5. pp. 6-7, 23, (1998), "Excalibur Enters the Video Market With The Release Of Excalibur Screening Room".
The IEEE Standard Dictionary of Electrical and Electronics Terms, IEEE STD 100-1996, Published by Institute of Electrical and Electronics Engineers, Inc., Sixth Edition, p. 648.
Videotape and Disk Recorders: DVCAM: DSR1, printed from http://bpgprod.sel.sony.com/modelfeatures.
bpg?cat+Videotape+and+Disk+Record . . . on Dec. 17, 1998 (2 pages).
Visionary, Media Access Technologies, Ltd., (1998) (Brochure) Automated Logging and Search Solution for Multimedia Streams and Libraries.
Office Action for U.S. Appl. No. 10/872,191 dated Mar. 27, 2008.
Hjelsvold, et al., Web-based personalization and management of interactive video, International World Wide Web Conference, Year 2001, pp. 129-139.
Zhou, et al., A web-enabled video indexing system, International Multimedia Conference, Year 2004, pp. 307-314.
Zhang, et al., A Natural language approach to content-based video indexing and retrieval for interactive E-learning, IEEE Transactions on Multimedia, V.6, Issue 3, Jun. 2004, pp. 450-458.
Babaguchi et al., Event based indexing of broadcasted sports video by Intermodal Collaboration, IEEE Transactions on Multimedia, V. 4, Issue 1, Mar. 2002, pp. 68-75.
Java Script XML Parser, http://www.stylusstudio.com/xmldev/199712/post70460.html, pp. 1-2, Dec. 31, 1997.
Hampapur et al., "Virage Video Engine," Virage, Inc., Mar. 1997, San Mateo, CA.
Virage, Inc., "Virage Media Management System," 1997, San Mateo, CA (brochure).
Virage, Inc. "The Virage Media Manager & Browser 1.1," 1998, San Mateo, CA (brochure).
Virage, Inc., "The Virage Video Cataloger 1.1," 1998, San Mateo, CA (brochure).
Virage, Inc., "Virage Video Cataloger & Video Browser," 1997, San Mateo, CA (brochure).
Virage, Inc. "The Virage Video Cataloger 1.3," 1998, San Mateo, CA (brochure).
Virage, Inc. "Virage Releases VideoLogger 2.0 at Streaming Media '98 Conference," 1998, San Mateo, CA (brochure).

PR Newswire Association Inc., "Duquesne University to Offer First Searchable Video Classes Over the Web: Partners With ISLIP Media to Build Advanced Internet Video Classes," Dec. 15, 1998.

Virage, Inc. Brochure, "Video Search Tools," Copyright 1999.

Virage, Inc. Brochure, MyLogger™, Copyright 1999.

Virage, Inc. Brochure, "Virage Interactive™," Copyright 1999.

Page from Virage Web Site, "Press Releases," www.virage.com/news/dec_1999_mylogger-launch.html, Dec. 7, 1999.

Page from Virage Web Site, "Virage Interactive," http://www.virage.com/products/vi.html, printed Jan. 6, 2000.

Page from Virage Web Site, "MyLogger," www.virage.com/products/mylogger.html, print Jan. 6, 2000.

Page from Virage Web Site, "Video Search Tools," www.virage.com/products/vst.html, printed Jan. 6, 2000.

Page from Innovatv.com Web Site, "Seeing is believing," http://www.innovatv.com/news_011000_em.htm, Jan. 10, 2000.

Page from Innovatv.com Web Site, "Tools & Technology," http://www.innovatv.com/tools.htm, printed Mar. 20, 2000.

Page from Innovatv.com Web Site, "iMag," http://www.innovatv.com/iMag.htm, printed Mar. 20, 2000.

Page from Innovatv.com Web Site, "myiMag.com," http://www.myimag.com/afterlogin4.asp, printed Mar. 20, 2000.

Page from MediaSite Web Site, "First Searchable Video Website Solution Adds New Content Providers," http://www.mediasite.net/info/prcontent.htm, Jun. 24, 1999.

Page from MediaSite Web Site, "MediaSite WebFinder 4.0," http//222.mediasite.net/info/ps_mkfin.htm, printed Jul. 28, 2000.

Page from MediaSite Web Site, "MediaSite Publisher Modules," http://www.mediasite.net/Info/ps_mkbul.htm, printed Jul. 28, 2000.

Page from MediaSite Web Site, "Branded MediaSites," http://www.mediasite.net/info/ps_branded.htm, printed Jul. 28, 2000.

Page from Akamai Web Site, "How EdgeScape Works," http://www.akamai.com/html/en/sv/edgescape_works.html, printed Mar. 27, 2001.

"Streaming Email", XP-002150023; Sep. 4, 1998; pp. 303-317.

Johnston, et al., Real-Time Digital Libraries Based on Widely Distributed, High Performance Management of Large-Data-Objects, International Journal of Digital Libraries, vol. 1, No. 3, Dec. 1997.

VIDEO-ENABLED COMMUNITY BUILDING

RELATED APPLICATIONS

This application is a continuation of U.S. application Ser. No. 09/828,618 filed Apr. 6, 2001, now U.S. Pat. No. 7,962,948, which claims priority to U.S. Provisional Application No. 60/195,728, filed Apr. 7, 2000 and titled "VIDEO-ENABLED COMMUNITY BUILDING." This application relates to U.S. application Ser. No. 09/827,772, filed Apr. 6, 2001 and titled "INTERACTIVE VIDEO APPLICATION HOSTING," now U.S. Pat. No. 7,222,163, to U.S. application Ser. No. 09/828,507, filed Apr. 6, 2001 and titled "VIDEO-ENABLED E-COMMERCE," now abandoned, and to U.S. application Ser. No. 09/828,506, filed Apr. 6, 2001 and titled "NETWORK VIDEO GUIDE AND SPIDERING," now U.S. Pat. No. 7,260,564. Each of the above applications is incorporated herein by reference in its entirety.

BACKGROUND OF THE INVENTION

1. Field of the Invention

The present invention generally relates to the field of accessing and processing digital video on a network such as the Internet. More particularly, the invention relates to providing efficient end user access to media content through community building mechanisms.

2. Description of the Related Technology

A number of techniques have evolved in recent years as the Internet has grown in size and sophistication, including:

The use of web servers and HTML delivery to web browsers.

The use of the application-server model for connecting database information with web pages and interactive interfaces for end users.

The use of dynamically generated HTML that pulls information from a database to dynamically format HTML for delivery to the end user.

The use of a template language to merge database output with pre-formatted HTML presentations.

The use of 'cookies' to track individual user preferences as they interact with the web pages and applications.

The use of messaging and chat technology.

The use of HTTP and FTP transfer protocols to upload video content to a website.

These and other related web technologies and techniques are in commonplace use and readily accessible on the Internet.

In addition to theses technologies, video indexing technology has also emerged, herein referred to as 'video logging'. Video logging is a process that incorporates both automated indexing and manual annotation facilities to create a rich, fine-grained (in a temporal sense) index into a body of video content. The index typically consists of a combination of visual and textual indices that permit time-based searching of video content. The index may incorporate spoken text, speaker identifications, facial identifications, on-screen text, and additional annotations, keywords, and descriptions that may be applied by a human user executing the video logging application. The Virage VideoLogger is one example of this type of video logging technology that is commercially available.

The delivery of streaming media on the Internet typically involves the encoding of video content into one or more encoded video formats and efficient delivery of that content for display to the end users. Common streaming formats presently in use include RealVideo, Microsoft Windows Media, QuickTime, and MPEG. The video logging technology may coordinate the encoding of one or more of these formats while the video is being indexed to ensure that the video index is time-synchronized with the encoded content. The final delivery of streaming media content for display to an end user is typically accomplished with a wide variety of video serving mechanisms and infrastructure. These mechanisms may include basic video servers (such as those from Real, Microsoft, or Apple), caching appliances (such as those from CacheFlow, Network Appliance, Inktomi, or Cicso), and content distribution networks (herein "CDN's", such as those from Akamai, Digital Island, iBeam, or Adero). These types of video serving mechanisms ultimately deliver media content for display to the end user.

In an Internet/World Wide Web environment, companies frequently attempt to generate revenue though advertising and e-commerce within their website. Whether selling products, services, or advertising, many attempt to build community, which refers to increasing the number of visitiors to a site, the number of repeat visitors, and the average visitation time, as a way to be commercially successful. Increased visitors, repeat visitors, and increased visitation time contribute to revenue streams derived from standard web-related advertising models. Additionally, such increased visitation propensities also allow more numerous and frequent opportunities for e-commerce products and services.

Therefore, what is needed in the technology is a system that provides community-oriented websites the capability to achieve their community building goals by exploiting video processing capabilities using rich and interactive media content. Moreover, compelling video content may be used to create websites that form communities of individuals with a common interest or set of interests. Video can play a central role in the website community if certain mechanisms are provided to the members of the community. Therefore, what is additionally needed in the technology is a system that provides such website community building mechanisms to community members, which may be used to build the actual community websites that many companies and website owners seek in order to enhance e-commerce revenue generation.

SUMMARY OF CERTAIN INVENTIVE ASPECTS

The present invention relates to techniques whereby various web-based community mechanisms are combined in an innovative way with an interactive video search and retrieval application environment. A video search and retrieval, (e.g. browse) application, as is described in U.S. application Ser. No. 09/827,772, filed Apr. 6, 2001 and titled "INTERACTIVE VIDEO APPLICATION HOSTING" and which was incorporated by reference above, gives website visitors the ability to search media content to find segments that are of interest. Utilizing these search and retrieval capabilities and a repository of engaging content, various community-building mechanisms may be provided. Such mechanisms include, for example, e-mailing video clips, collecting favorite video clips in a personal folder, combining video with chat, combining video with message boards, and supporting the uploading to the website of video content from the community members.

In one embodiment, the invention provides a video community system comprising an index generator of video content configured to generate an index of the video content, an encoder of the video content configured to generate encoded video content, a video search and retrieval application configured to access the index of the video content and a repository storing the index of the video content and the encoded video content, and being accessible by the video search and retrieval application, wherein a selected portion of the repository is processed in response to a user-selected operation so as to be shareable with at least one other user.

In another embodiment, the invention provides the video community system described above, wherein the user-selected operation is one of the following: sending as an e-mail message, selectively indexing as a user-identified favorite video, placing in a video chat room, or placing in a video message board. In another embodiment, the invention provides the video community system described above, further comprising an uploader of selected video content to the repository.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

DETAILED DESCRIPTION OF CERTAIN EMBODIMENTS

Figure 1:
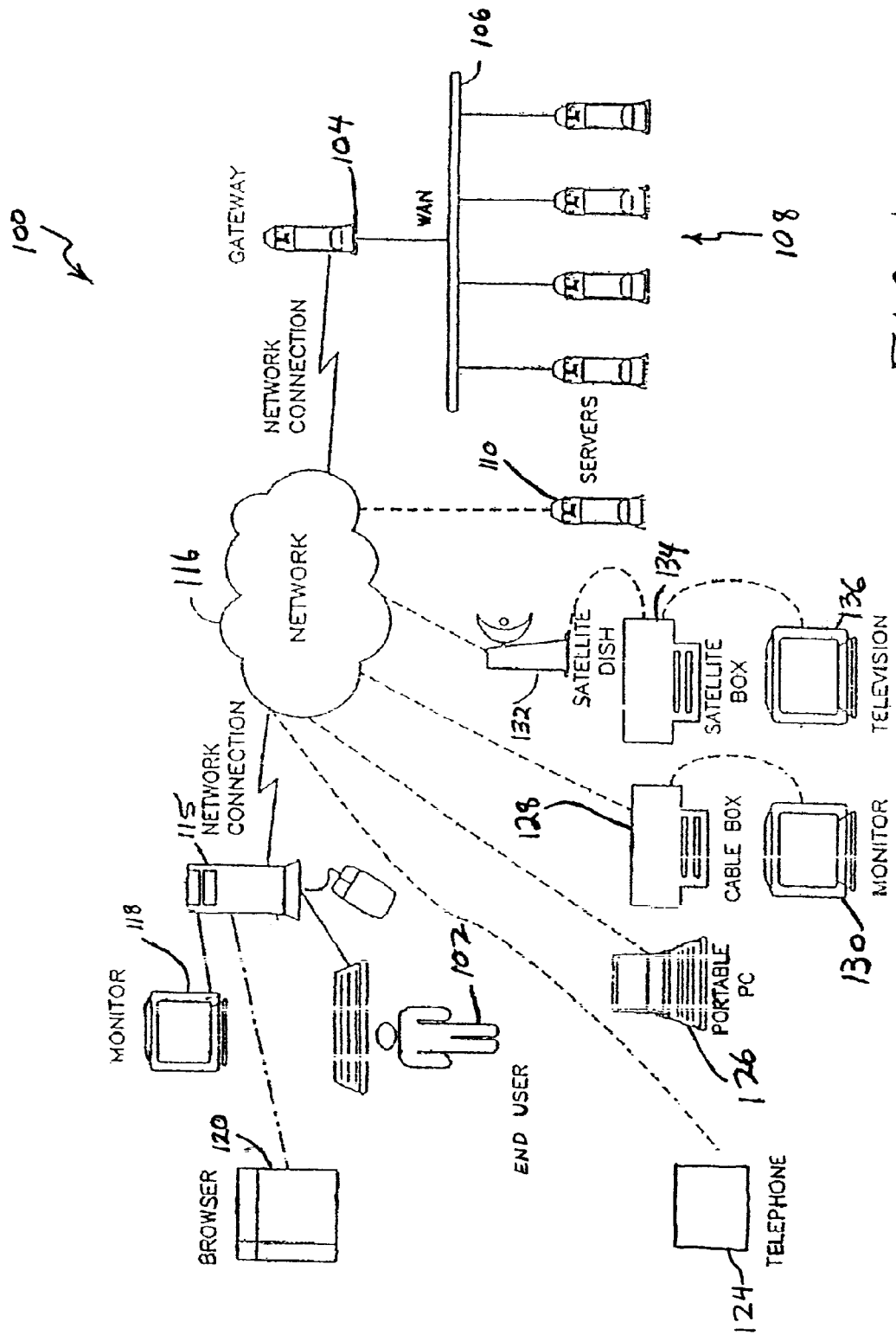
FIG. 1 is a diagram of a typical network configuration in which this invention may operate.

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

DEFINITIONS

The following provides a number of useful possible definitions of terms used in describing certain embodiments of the disclosed invention.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

A website may refer to one or more interrelated web page files and other files and programs on one or more web servers. The files and programs are accessible over a computer network, such as the Internet, by sending a hypertext transfer protocol (HTTP) request specifying a uniform resource locator (URL) that identifies the location of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

A web page or electronic page may comprise that which is presented by a standard web browser in response to an HTTP request specifying the URL by which the web page file is identified. A web page can include, for example, text, images, sound, video, and animation.

Content, media content and streaming media content may refer to the delivery of electronic materials such as music, videos, software, books, multimedia presentations, images, and other electronic data, for example over a network to one or more users. Content data will typically be in the form of computer files for video, audio, program, data and other multimedia type content as well as actual physical copies of valuable content, for example CD-ROM, DVD, VCR, audio, TV or radio broadcast signals, streaming audio and video over networks, or other forms of conveying such information. The terms content, media content and streaming media content may be used interchangeably herein.

A computer or computing device may be any processor controlled device that permits access to the Internet, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, Unix, any of the versions of Microsoft Windows, Apple MacOS, IBM OS/2 or other operating system. The appropriate operating system may include a communications protocol implementation that handles all incoming and outgoing message traffic passed over the Internet. In other embodiments, while the operating system may differ depending on the type of computer, the operating system will continue to provide the appropriate communications protocols to establish communication links with the Internet.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to the website. In this instance, the website includes program logic, which enables the website to communicate with the externally implemented components, modules, and databases to perform the functions as disclosed herein.

Certain Innovative Aspects

An innovative aspect of the present system and method involves employing offset video stream pointers, for example URL references, to communicate, collect, or share video information without having to physically copy large amounts of video content around the network. Such video information may include, for example, e-mail messages, file folders, message boards, or chat systems. A mechanism of using URL references offers many advantages, including, for example, eliminating the need to physically divide the video into clips, allowing overlapping video clips, and eliminating the need to copy the actual video content, thereby reducing network bandwidth and system storage requirements.

Such various video and network features, when used in combination as described herein, achieve the goal of strategically utilizing interactive video to build an online community environment. A further innovative aspect involves combining multiple community-building mechanisms to create a video-rich environment for interaction, sharing, and collaboration. Therefore, one innovative aspect involves certain network and video features and capabilities to enhance website community building, which in turn may be used by companies and website owners in order to favorably enhance e-commerce revenue generation.

In one embodiment, community building is enhanced by the utilization of video capabilities in combination with e-mail. Users have the capability to identify a selected portion of video, commonly referred to as a "clip", through any of the interactive search or retrieval mechanisms. The user may compose an e-mail message that automatically includes a text string, which is the web-based reference to the clip. The text string may be a URL, which may be invoked by the recipient of the e-mail message to transmit (e.g. stream) the video content of the clip to the Internet browser executing on the recipient's computer. The actual video clip contents are not part of the e-mail message, as this would be highly cumbersome, both in the consumption of storage facilities at the recipient's computer and in the network/server bandwidth in transferring the video clip itself.

An innovative aspect of this embodiment is the use of playback offsets to reference the segment of time that defines the clip. The clip URL may contain arguments that specify the start and end times of the clip. On the video hosting community website or content distribution network ("CDN"), the video content remains in what is referred to in the technology as "long form," or in other words not physically chopped up into clips, and portions of video are accessed using the time offsets. Such playback using timing offsets may be implemented a variety of ways. In one embodiment, timing offsets are obtained from the selected clip, and a proper URL is constructed to exploit the timing offset feature of the video server or CDN.

In another embodiment, community building is further enhanced by the utilization of video features in combination with chat technology. Chat technology employs a mechanism commonly referred to as "chat rooms", which creates a virtual location where specific topics can be discussed by community members contemporaneously, in other words users see and respond to messages interactively as they are posted. Video-enabled chat places one or more video clips in the chat room, allowing each user to view the video and make comments about it. Video content can be streamed on demand, for example when the user pushes the "play" button, or can be a live stream that multiple users see simultaneously. Video clips may be referenced using the URL-playback-with-offset mechanism discussed below in the description of FIG. 6. Standard chat facilities can interoperate with the video enhancement, including the dynamic, user creation of new chat rooms with selected video.

In another embodiment, community building is further enhanced by the utilization of video features in combination with message boards. Message boards typically provide community interaction similar to chat technology, but without the contemporaneous element. On a typical message board system, users may post individual messages, and can also review previously posted messages. Messages are often archived and searchable. Video-enabled message boards additionally allow video content to be included as part of a message, for example by including the URL reference mechanism as a way to post a video clip to a message board. In viewing the message board contents, the user may, for example, view video metadata or the encoded video, or e-mail the clip to another.

DESCRIPTION OF THE FIGURES

FIG. 1 is a diagram of a typical network configuration 100 in which this invention may operate. However, various other types of electronic devices communicating in a networked environment may also be used. An end user 102 communicates with a computing environment, which may include multiple server computers 108 or a single server computer 110 in a client/server relationship on a network communication medium 116. In a typical client/server environment, each of the server computers 108, 110 may include a server program that communicates with a user device 115, which may be a personal computer (PC), a hand-held electronic device, a mobile or cellular phone, a TV set or any number of other electronic devices.

The server computers 108, 110, and the user device 115 may each have any conventional general purpose single- or multi-chip microprocessor, for example a Pentium processor, a Pentium Pro processor, a MIPS processor, a Power PC processor, an ALPHA processor, or other processor. In addition, the microprocessor may be any conventional special purpose microprocessor such as a digital signal processor or a graphics processor. Additionally, the server computers 108, 110 and the user device 115 may be desktop, server, portable, hand-held, set-top, or other desired type of computing device. Furthermore, the server computers 108, 110 and the user device 115 each may be used in connection with various operating systems, including, for example, UNIX, LINUX, Disk Operating System (DOS), VxWorks, PalmOS, OS/2, any version of Microsoft Windows, or other operating system.

The server computers 108, 110 and the user device 115 may each include a network terminal equipped with a video display, keyboard and pointing device. In one embodiment of the network configuration 100, the user device 115 includes a network browser 120 used to access the server computers 108,110. The network browser 120 may be, for example, Microsoft Internet Explorer or Netscape Navigator. The user 102 at the user device 115 may utilize the browser 120 to remotely access the server program using a keyboard and/or pointing device and a visual display, such as a monitor 118. Although FIG. 1 shows only one user device 115, the network configuration 100 may include any number of client devices.

The network 116 may be any type of electronic transmission medium, for example, including but not limited to the following networks: a virtual private network, a public Internet, a private Internet, a secure Internet, a private network, a public network, a value-added network, an intranet, or a wireless gateway. The term "virtual private network" refers to a secure and encrypted communications link between nodes on the Internet, a Wide Area Network (WAN), Intranet, or any other network transmission means.

In addition, the connectivity to the network 116 may be via, for example, a modem, Ethernet (IEEE 802.3), Token Ring (IEEE 802.5), Fiber Distributed Datalink Interface (FDDI), Asynchronous Transfer Mode (ATM), Wireless Application Protocol (WAP), or other form of network connectivity. The user device 115 may connect to the network 116 by use of a modem or by use of a network interface card that resides in the user device 115. The server computers 108 may be connected via a wide area network 106 to a network gateway 104, which provides access to the wide area network 106 via a high-speed, dedicated data circuit.

As would be understood by one skilled in the technology, devices other than the hardware configurations described above may be used to communicate with the server computers 108, 110. If the server computers 108, 110 are equipped with voice recognition or Dual Tone Multi-Frequency (DTMF) hardware, the user 102 may communicate with the server computers by use of a telephone 124. The telephone may optionally be equipped with a browser 120 and display screen. Other examples of connection devices for communicating with the server computers 108, 110 include a portable personal computer (PC) 126 or a personal digital assistant (PDA) device with a modem or wireless connection interface, a cable interface device 128 connected to a visual display 130, or a satellite dish 132 connected to a satellite receiver 134 and a television 136. Still other methods of allowing communication between the user 102 and the server computers 108, 110 are additionally contemplated by this application.

Additionally, the server computers 108, 110 and the user device 115 may be located in different rooms, buildings or complexes. Moreover, the server computers 108, 110 and the user device 115 could be located in different geographical locations, for example in different cities, states or countries. This geographic flexibility which networked communications allows is additionally within the contemplation of this application.

Figure 2:
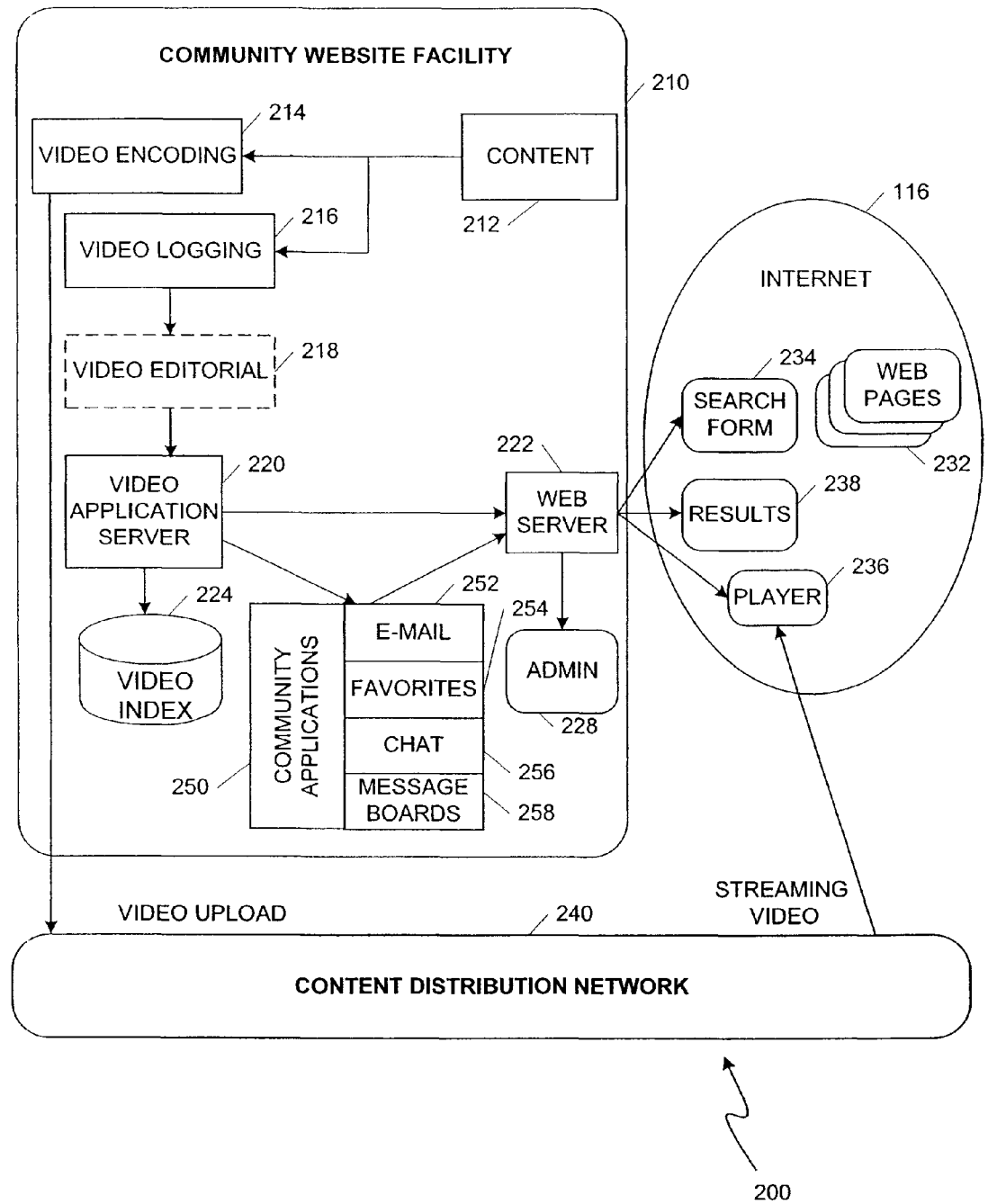
FIG. 2 is a block diagram of a system architecture in accordance with one embodiment of the invention.

FIG. 2 is a block diagram of a system architecture 200 in accordance with one embodiment of the invention. In this embodiment, the system architecture 200 includes a community website facility 210, which further includes media content 212. The community website facility 210 further includes a video encoding module 214, which receives the media content 212. The community website facility 210 further includes a video logging module 216, which receives the media content 212. The community website facility 210 further includes a video editorial module 218, which communicates with the video logging module 216. The community website facility 210 further includes a video application server 220, which communicates with the video editorial module 218. The community website facility 210 further includes a web server 222, which communicates with the video application server 220. The community website facility 210 further includes a video index 224, which is produced by the video logger module 216 and video editorial module 218, and maintained by the video application server 220. The community website facility 210 further includes a server administration ("Admin") module 228, which communicates with the web server module 222. The community website facility 210 further includes a community applications module 250, which includes e-mail 252, favorites 254, chat 256 and message boards 258 community-building sub-modules. These sub-modules are described in greater detail below with regards to certain embodiments of FIG. 2, and additionally in reference to FIGS. 5, 8, 7 and 6, respectively.

In one embodiment, the system architecture 200 further includes the network 116 shown in FIG. 1, which may be the Internet. Web pages 232 and search forms 234 are accessible via the Internet 116. Each web page 232 may depict a plurality of pages rendered by various web servers. The search form 334 is also accessible by the community website facility web server 222. Additionally accessible via the Internet 116 are results data 238, which are produced by the community website facility web server 222. Also accessible via the Internet 116 is a video player 236, which communicates with the community website facility web server 222. The system architecture 200 further includes a content distribution network 240, which transfers encoded video to the video player 236. The content distribution network 240 further receives uploaded digital video files from the community website facility video encoding module 214. The content distribution network 240 may be part of a wide variety of video serving mechanisms and infrastructure that serve to deliver encoded media content for display to the end user 102 shown in FIG. 1. The content distribution network 240 may include a content owner running a simple video server at the content owner facility 220, a complex edge caching content distribution mechanism, or other mechanisms to stream video and other media content for display to end users 102.

The following paragraphs provide a description of the operation of one embodiment of the system architecture 200 shown in FIG. 2. A community website may be hosted internally on the community owner's web server 222 as shown in FIG. 2, or alternatively out-sourced to a web-hosting service provider, which delivers community features as described herein to end users 102. The operation of the video encoding module 214, video logging module 216, video editorial module 218, video application server module 220, video index 224, administration module 228, and web server 222 are described in the related application titled "INTERACTIVE VIDEO APPLICATION HOSTING," which was incorporated by reference above. To the extent that these modules may operate differently than in the related application, any such differences will be described herein.

In one embodiment, the video application server module 220 manages the video index containing metadata and annotations produced by the video logging module 216. The application server 220 receives video index data after the video logging 216 and video editorial 218 modules, and transfers video search form 234 queries and results 238 data to the community website facility web server 222 for display to an end user 102 in a web browser 120 at the user device 115 via the Internet 116. In one embodiment, the communication of search form 234 queries and results 238 data to the web server 222 includes an exchange of XML data, although one skilled in the technology will understand that other data exchange formats may also be utilized. Final HTML rendering of search forms 234, results 238 presentation, and video player 236 playback windows may be accomplished via templates, whereby such templates dictate the graphical look-and-feel of the final media presentation. Actual metadata results, communicated via XML or other data exchange formats, may be rendered into the template by substituting special keywords with results from the application server 220 to form an HTML-compliant presentation. Additional communications may be provided with the administration module 228 for server administration, metadata editing, and batch processing. Batch processing may be accomplished for insertion processes, deletion or 'aging' processes, metadata editing, or for automated performance of other tasks as well. The administration module 228 further allows system administrators to manage the video application server 220, including, for example, index management, asset management, editing, and startup and shutdown control.

In one embodiment, regardless of its original form, the content 212 is processed by the video logging module 216 to extract index data, for example keyframes, closed-caption text, speaker identifications, facial identifications, or other index data. The content 212 may additionally undergo processing by a video editorial module 218, whereby humans may elect to label the content 212 by providing additional annotations, descriptions, keywords, or any other marking information. The index and annotation information is transferred to the video application server 220, which hosts publishing, search, retrieval, browse, or other related video services. The video application server 220 may maintain the metadata in the video index 224. The video application server 220 provides the above-described video services to the web server 222 for incorporation into the web pages 232 via the template mechanism described above.

In another embodiment, the video application server 220 includes the server itself that processes XML-based queries and data management activities, performs searches against the video index, and returns video references and metadata via XML or other data exchange formats. Other standard modules of the video application server 220 include the search or retrieval rendering interface which processes HTML requests into XML, and additionally processes XML responses back into HTML for delivery by the web server 222 using templates to format and render the XML data into HTML.

The video application server's 220 XML-based open architecture allows for simple integration of additional features and functions, for example syndication engines, e-commerce engines, or the community application sub-modules 252, 254, 256, 258 described herein. Such sub-modules may be implemented in various commonly used programming languages, for example Perl, C, C++, Java, or other programming languages, and may utilize publically or commercially available packages for parsing and formatting XML or other data exchange formats.

In the embodiment shown by FIG. 2, one such sub-module for video-based community interactions is the e-mail sub-module 252. The e-mail sub-module 252 may be invoked via a hyperlink (URL) embedded in any rendered template or HTML web page specifying that the user 102 wishes to e-mail a particular video clip. The hyperlink contains arguments that specify a media clip, for example via an asset identifier or other unique identifier, to the application server 220. The e-mail sub-module 252 may use this information to form an XML query to the application server 220, which returns the corresponding video URL used for actual playback of the video stream. Such a URL is inserted into the body of an e-mail message, which the user 102 may send to a desired e-mail address, optionally adding a subject, message, and signature as specified. The recipient of such an e-mail message may simply click on the video URL to view the video clip. In one embodiment, the actual video data is not transferred by the e-mail message, saving valuable system resources such as network bandwidth and local hard disk storage space.

In the embodiment of FIG. 2, another such sub-module for video-based community interactions is the message board sub-module 258. This sub-module provides an interface with various message board systems, such as standard, commercial or share-ware systems, to augment the messaging capabilities with video attachments. Examples of common message board systems include PHP, Prospero Technologies, Hypermail, or various other message board systems. The message board sub-module 258 may be invoked via a hyperlink in the standard search or retrieval templates, or other HTML page with a URL specifying that the user 102 wishes to share a particular video or other media clip. The message board sub-module 258 may use the video clip identifier to format an HTML fragment or video URL that can be embedded in a posted message. The HTML fragment method typically involves a few lines of HTML code that contains URLs to access the video application server 220 and retrieve associated metadata about the clip. This could include a thumbnail image or keyframe, clip title, partial transcript, or other desired part or whole of the metadata available for that clip. The format and layout of the HTML fragment is commonly dictated by a template using the same techniques generally used by the application server 220 for search, retrieval, and results presentations as described above. A more basic URL method simply includes a video URL in the message body that any user 102 may click on to play back the video. One skilled in the art would understand that this is technically feasible since messages posted on message boards are nearly identical to e-mail.

In the embodiment of FIG. 2, another such sub-module for video-based community interactions is the chat sub-module 256. This sub-module provides an interface with various chat systems, for example standard, commercial or share-ware chat systems, to augment the messaging capabilities with video attachments. Examples of common chat systems include Internet Relay Chat (IRC), ParaChat, ChatBox, CheetaChat, or other chat systems. The chat sub-module 256 may be invoked via a hyperlink in the standard search or retrieval templates, or any HTML page with a URL specifying that the user 102 wishes to share a particular video or other media clip. The chat sub-module 256 may use the video clip identifier to format an HTML fragment or video URL that can be embedded in a posted message. The HTML fragment method typically involves a few lines of HTML code that contains URLs to access the video application server 220 and retrieve associated metadata about the clip. This could include a thumbnail image or keyframe, clip title, partial transcript, or other desired part or whole of the metadata available for that clip. The format and layout of an HTML fragment is commonly dictated by a template using the same techniques generally used by the application server 220 for search, retrieval, and results presentations. A more basic URL method simply includes a video URL in the chat message body that any user 102 may click on to play back the video. One skilled in the art would understand that this is technically feasible since messages posted on chat systems are nearly identical to e-mail.

In the embodiment of FIG. 2, another such sub-module for video-based community interactions is the video favorites sub-module 254. The favorites sub-module 254 may provide a large number of various mechanisms of allowing users 102 to identify locations of interest in media content files. These include, for example, associating and maintaining a favorites folder for a plurality of users 102 based on unique user identifications, identifying highlights, clip-bin, shopping cart, and other such mechanisms. The user identification may be managed via traditional 'cookie' mechanisms, or may be enforced via a user identification and password login combination. The favorites sub-module 254 may be invoked by an embedded URL in a template or HTML page specifying that the user 102 wishes to identify particular video clips of interest. These clips can be saved, or 'bookmarked', and the favories sub-module 254 may use the clip ID and the user ID to add the clip reference to the user's folder, which is displayed not as a list of URLs, but similar to the general search or retrieval interface. The favorites sub-module 254 may render the user's favorite video clips using the same template mechanism as the standard video application server 220 search, retrieval, browse, or results rendering. The favories sub-module 254 typically accesses the video application server via XML to retrieve clip metadata, which is then rendered into the template. The clip rendering may include the display of any or all available metadata for that clip, for example a thumbnail image or keyframe, title, transcript, or other metadata, or may be reduced to a simple video URL for playback. In one embodiment, the user 102 may uniquely control the visual rendering of the clips in their folder. The favorites sub-module 254 may also offer the user 102 the ability to play back a selected clip, re-order the clips, delete a clip, or send a clip to the e-mail 252, chat 256, or message board 258 sub-modules.

Figure 3:
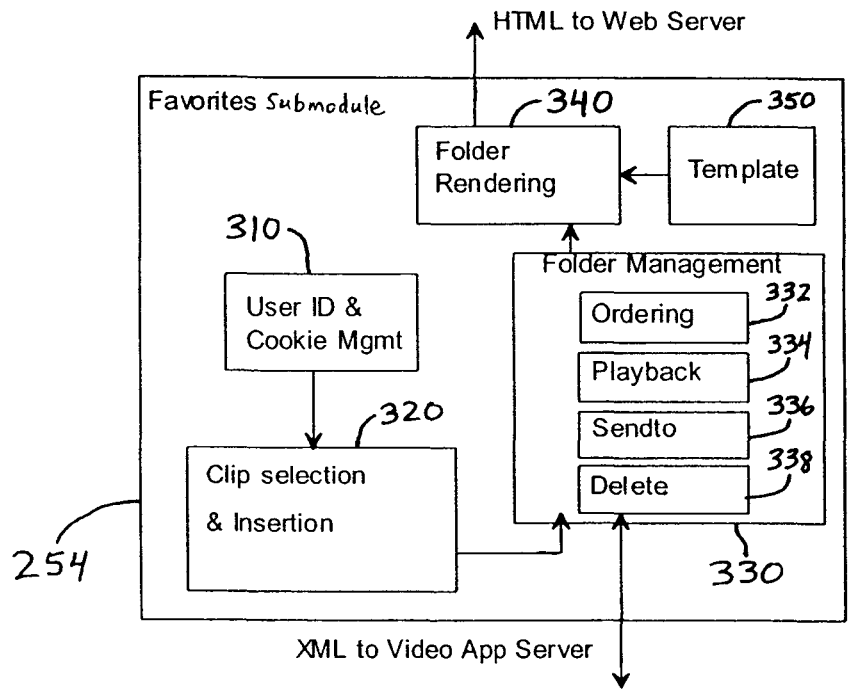
FIG. 3 is a block diagram of a favorites sub-module of a community applications module embodiment such as shown in FIG. 2.

FIG. 3 is a block diagram of a favorites sub-module 254 of a community applications module 250 embodiment such as shown in FIG. 2. In one embodiment, the favorites sub-module 254 includes a User ID and Cookie Management sub-module 310. The favorites sub-module 254 further includes a Clip Selection and Insertion sub-module 320, which communicates with the User ID and Cookie Management sub-module 310. The favorites sub-module 254 further includes a Folder Management sub-module 330, which is comprised of the actions on the clips of playback 334, send to 336, ordering 332, and deletion 338. The Folder Management sub-module 330 communicates with the Clip Selection and Insertion sub-module 320. The favorites sub-module 254 further includes a final HTML Folder Rendering sub-module 340, which uses the template mechanisms 350 of the video application server 220 and additionally communicates with the Folder Management sub-module 330.

Figure 4:
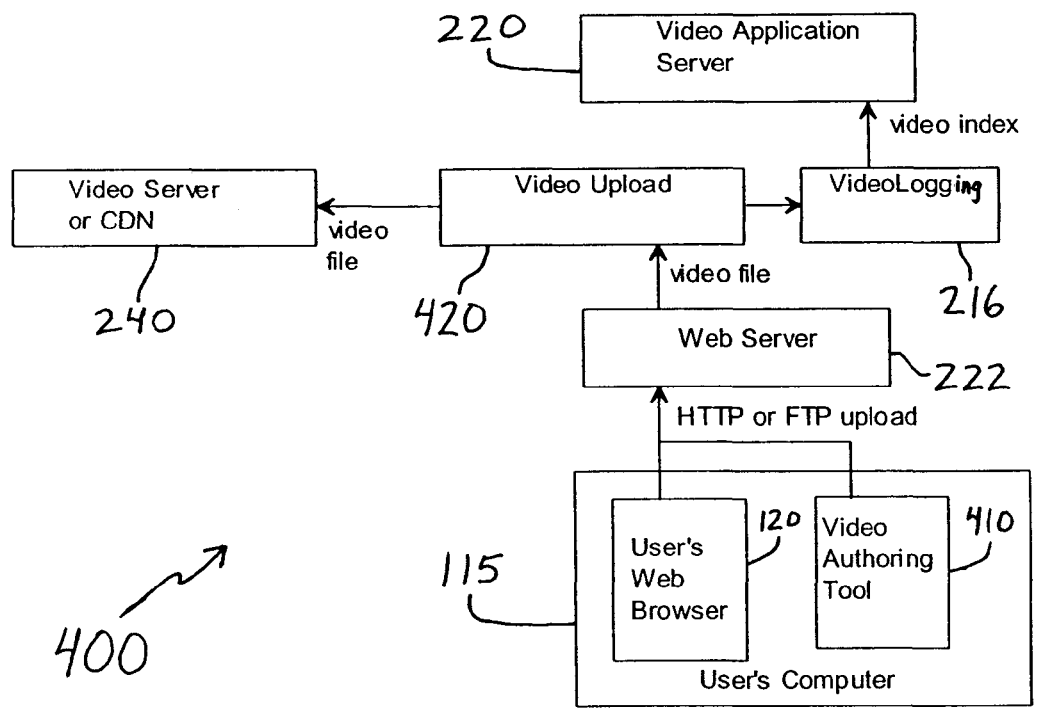
FIG. 4 is a block diagram of an embodiment of a video content upload facility.

FIG. 4 is a block diagram of an embodiment of a video content upload facility 400. In one embodiment, the upload facility 400 includes the user device 115 of FIG. 1, which further includes video authoring tools 410, which may be used to create the video content 212 of FIG. 2, and the web browser 120. The user device 115 communicates with the web server 222 via the network 116, such as the Internet. The video authoring tools 410 may involve a camera, capture hardware and software, or an editing system such as Adobe Premier or other media editing systems. The upload facility 400 additionally includes a video upload module 420, which receives video files from the web server 222. In one embodiment, the upload module 420 is accessed by the user 102 using a standard web browser 120. In another embodiment, the content files 212 are transferred to the web server 222 via HTTP or FTP protocols from the user device 115. The upload module 420 invokes the video logging module 216 to index the content files 212 and extract keyframes and metadata. The video index is then added to the video index database 224 managed by the video application server 220 as described above with regards to FIG. 2, and a copy of the content file 212 is sent to the content distribution network 240 for distribution and playback. In further embodiments, the content distribution network 240 may be a dedicated video server or edge caching network.

Compelling content 212 is an advantageous component of a video-based online community. One way to enhance or achieve compelling content 212 is to enable community member users 102 to contribute their own video content 212 to the community repository. Users 102 may author their own video content 212 and upload it to the community website using standard network transfer protocols such as HTTP or FTP. The content 212 may be logged and indexed at either the user device 115, or at the community website when the content 212 is uploaded. Once uploaded, the user-supplied content 212 becomes part of the content repository, and all the above-mentioned media features are available.

Figure 5:
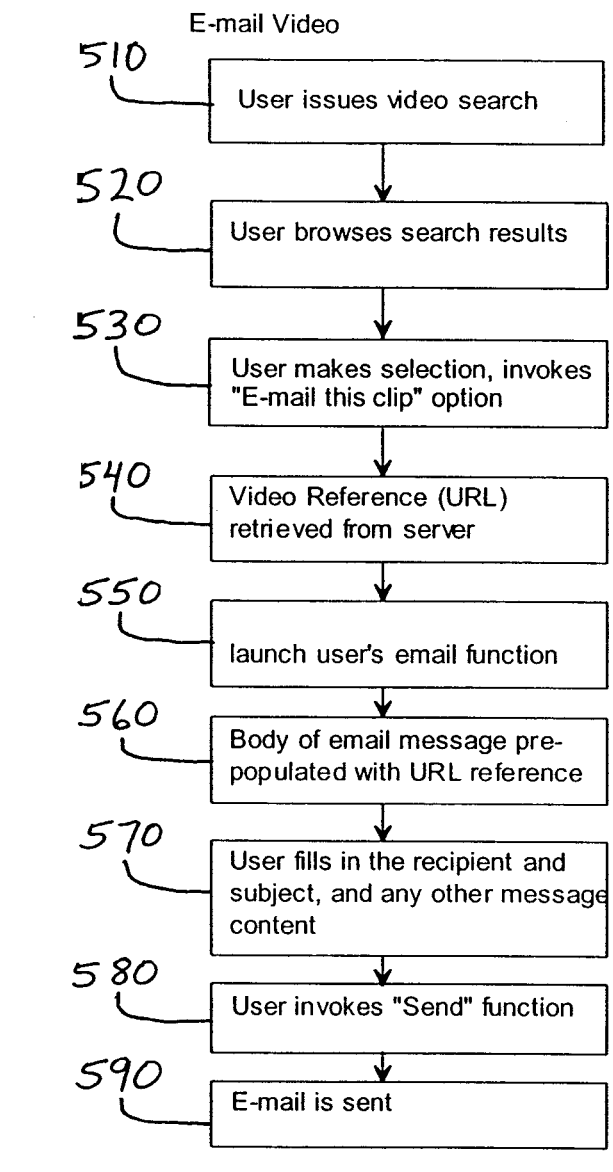
FIG. 5 is a flowchart of a process of user interaction with an e-mail sub-module of a community applications module embodiment such as shown in FIG. 2.

FIG. 5 is a flowchart of a process 500 of user interaction with an e-mail sub-module 252 of a community applications module 250 embodiment such as shown in FIG. 2. In this embodiment, the process begins at block 510 with the user 102 performing searches by issuing video search requests. At block 520, the user 102 retrieves or browses the search results and the video database. Once a desired clip is identified, at block 530 the user 102 can invoke a link to the "E-mail this clip" option. This video reference link is a URL that is retrieved from the server 222 at block 540, typically via the XML markup language. At block 550, the user's e-mail facility is launched, typically via the Simple Network Management Protocol (SNMP) 'mailto' facility, with a reference to the video clip identifier as an argument. The e-mail facility then uses the video clip identifier to access the video URL that can be used to play back the clip. At block 560 the e-mail facility forms a new e-mail message containing this URL in the body of the message. The user can then, at block 570, designate the recipient of the e-mail message, and add any message desired into the e-mail body, for example describing or commenting on the video clip. At block 580, the user invokes the send function of their e-mail facility, and at block 590 the e-mail message is sent using a standard communication with the user's mail server. One of ordinary skill in the relevant technology will understand this embodiment utilizing standard e-mail transmission.

Figure 6:
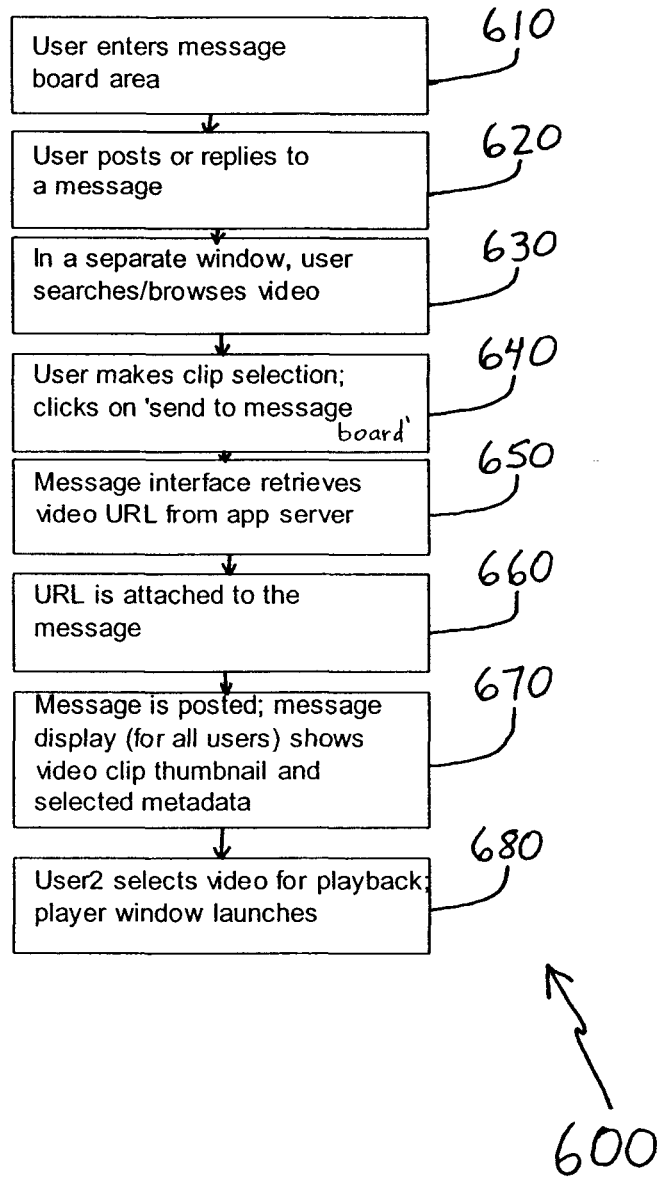
FIG. 6 is a flowchart of a process of user interaction with a message board sub-module of a community applications module embodiment such as shown in FIG. 2.

FIG. 6 is a flowchart of a process 600 of user interaction with a message board sub-module 258 of a community applications module 250 embodiment such as shown in FIG. 2. In one embodiment, the process 600 begins at block 610 with a user accessing the message board area, typically a web page, where messages can be viewed, sorted, searched, posted, responded to, or other standard message board features. At block 620, the user 102 may elect to post a new message or reply to an existing message. In the instances where the user 102 desires to include a video clip in an e-mail message, at block 630 the user 102 accesses the search or retrieval feature of the video application server 220, typically in a separate window, to perform the requested search. Continuing at block 640, the user 102 may select an ensuing video clip, and further select a "Send to Message Board" link, which is present in the video search results 238 presentation for each clip. In one embodiment, this "Send to Message Board" link may invoke the message board sub-module 258 with a video clip identifier, which, at block 650, uses this identifier to request the video application server 220 to retrieve either a basic video URL or an HTML fragment which displays selected video clip metadata. At block 660, the URL or HTML fragment is attached to the message, where it may be visible to users 102 viewing the message. This process of attaching to the message may be as simple as embedding the text of the URL at the bottom of the message or may include more complex HTML rendering, depending, for example, on the capabilities of the message board system. Any user 102 may then select the video clip for playback viewing.

Figure 7:
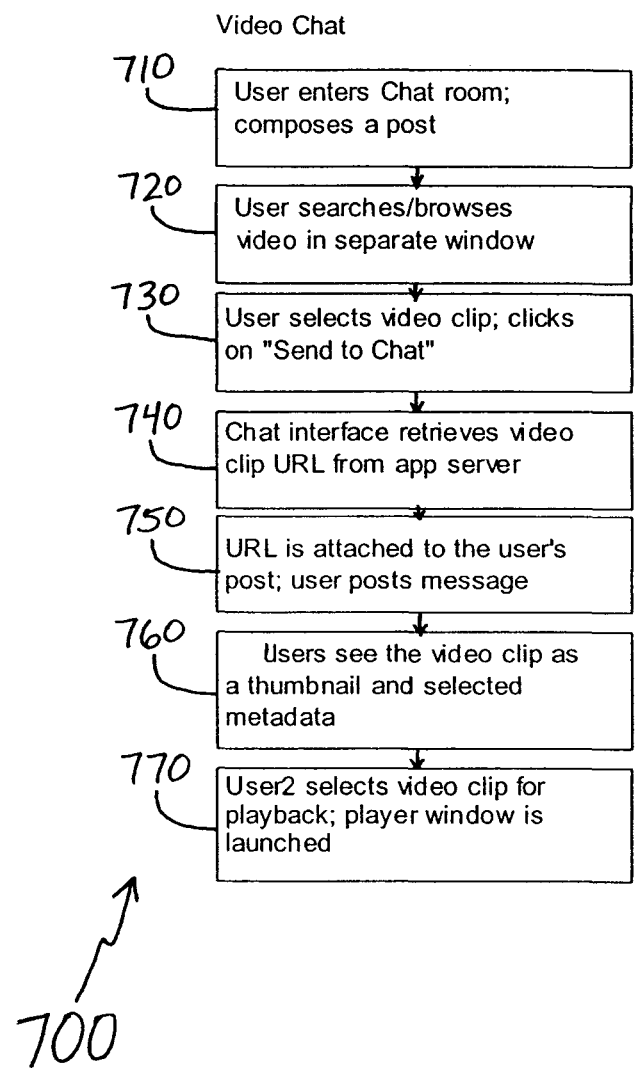
FIG. 7 is a flowchart of a process of user interaction with a chat sub-module of a community applications module embodiment such as shown in FIG. 2.

FIG. 7 is a flowchart of a process 700 of user interaction with a chat sub-module 256 of a community applications module 250 embodiment such as shown in FIG. 2. In this embodiment, the process 700 begins at block 710 with the user 102 accessing a chat area, typically a web page showing chat activity contemporaneously. Additionally at block 710, the user elects to post a chat message that also contains a video clip reference. At block 720, the user may access the video application server 220 search or retrieval features, sometimes in a separate window, to locate a video clip of interest. At block 730, in the video search results 238 presentation, each clip may have a link to a "Send to Chat" request, which the user may select for the desired clip. This link may invoke the chat sub-module 256 with a video clip identifier. Continuing at block 740, the chat sub-module 256 may use this identifier to access the video application server 220 to retrieve either a basic video URL or an HTML fragment that displays selected video clip metadata. At block 750, the URL or HTML fragment is sent to the chat display, which could be as simple as embedding the text of the URL at the bottom of the message or possibly a more complex HTML rendering depending on the capabilities of the message board system, where it is visible to users 102 viewing the post. A user 102 may then select the video clip for playback viewing. Typically, users 102 in the chat area would view the video, then continue to make posts commenting on the video content.

Figure 8:
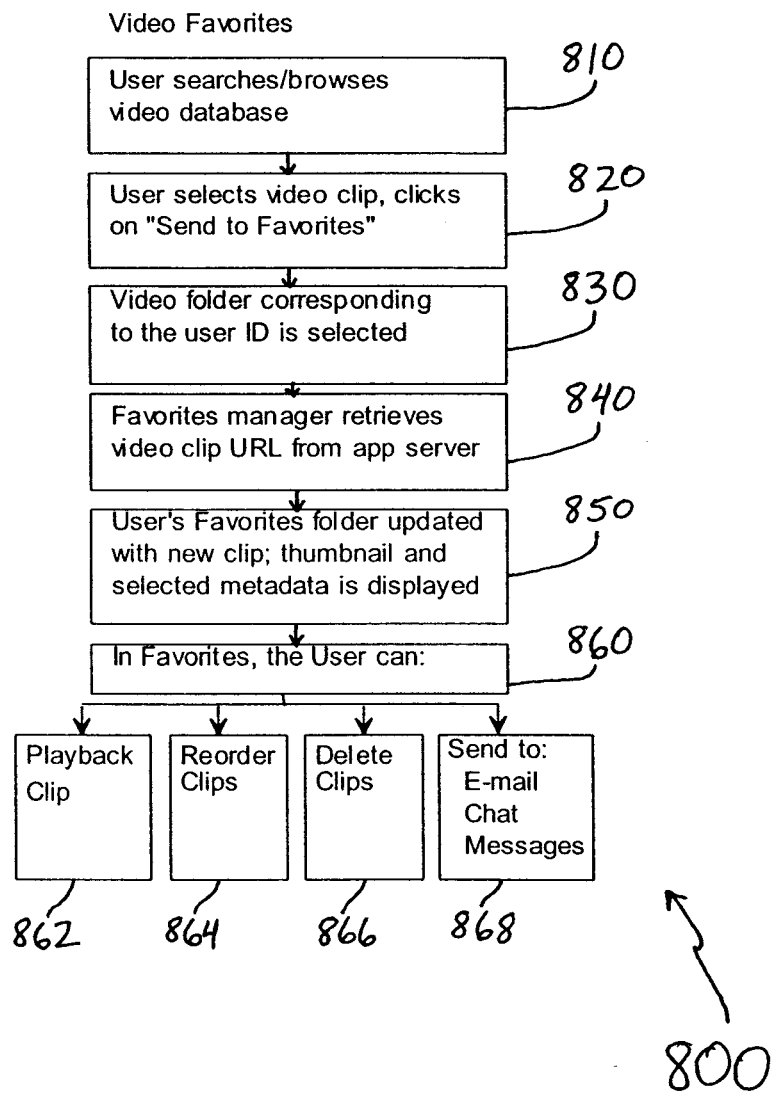
FIG. 8 is a flowchart of a process of user interaction with a favorites sub-module of a community applications module embodiment such as shown in FIG. 2.

FIG. 8 is a flowchart of a process 800 of user interaction with a favorites sub-module 254 of a community applications module 250 embodiment such as shown in FIG. 2. In one embodiment, the process 800 begins at block 810 with a user 102 performing search or retrieval operations against the video database. The user 102 may be positively identified by entering a user identifier and password combination, automatically tracked using standard 'cookie' mechanisms, or other methods of authenticating users. At block 820, having located a clip of interest, the user 102 may select a "Send to Favorites" link associated with the clip. This link may invoke the favorites sub-module 254 with a video clip identifier, and at block 830 the module 254 inserts this clip identifier into the favorites folder for that user 102. Continuing at block 840, the video application server 220 maintains folder information for each user based on their identifier, and persistently stores their current video favorites across visits of that user to the site. At block 850, the user's 102 favorites folder is updated with the new clip, and the folder is rendered with its current contents, preferably in a separate window from the rest of the video site. At block 860, this window offers several options for the user, including, for example, play-back clips 862, reorder clips 864, delete clips 866, or send clips 868. The send clips 868 option may allow the user 102 to send clips to, for example, one or more of the e-mail 252, message board 258, or chat 256 sub-modules.

Figure 9:
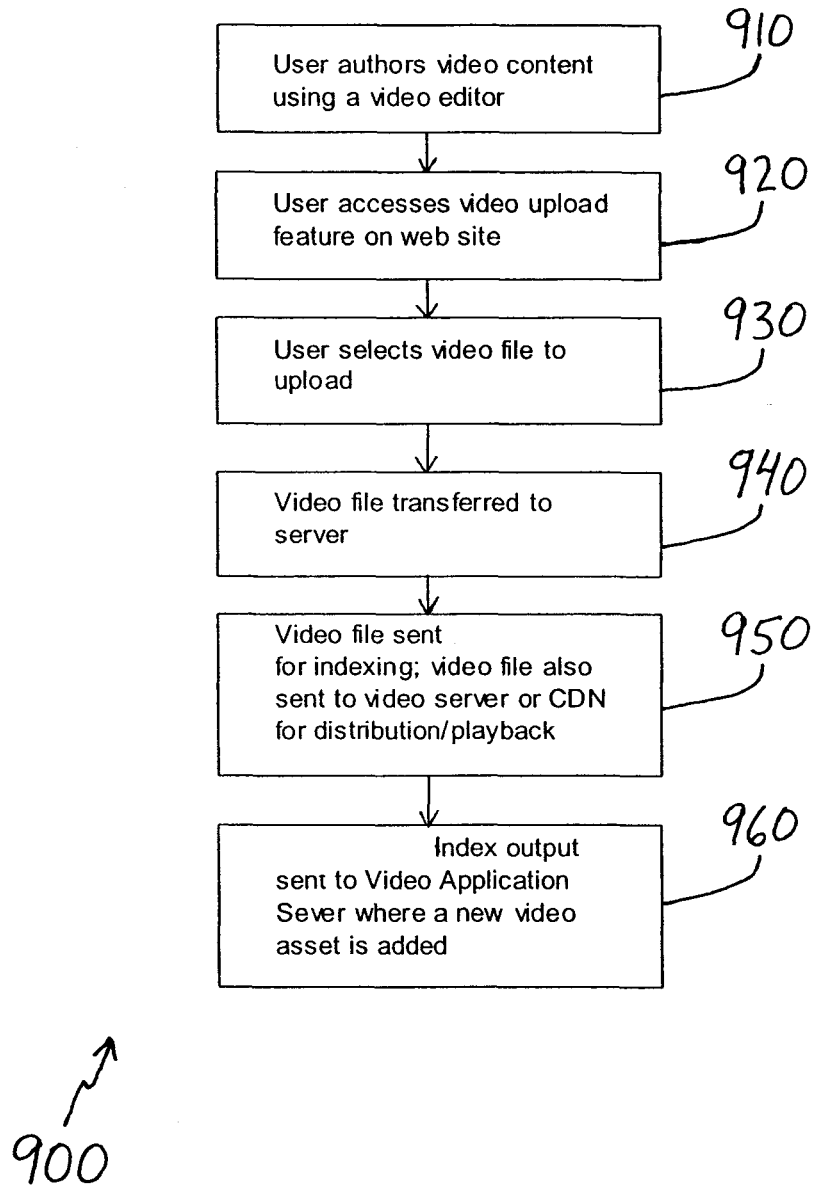
FIG. 9 is a flowchart of a process of user interaction with a video content upload facility embodiment such as shown in FIG. 4.

FIG. 9 is a flowchart of a process 900 of user interaction with a video content upload facility 400 embodiment such as shown in FIG. 4. In one embodiment, this process 900 involves the steps of uploading video from a user's computer 115 and contributing that video to the video database managed by the community website and the video application server 220. The process 900 begins at block 910 with the user creating or editing video content using one or more of the many authoring or video editing tools designed for this purpose. Once the video is created, it typically resides on the user computer 115 in the form of a digital video file, although other forms are contemplated as well. At block 920, the user 102 accesses the video website using a web browser, and selects the video upload feature. Continuing at block 930, the user 102 may be prompted to select the desired video file or files from their computer 115 to upload. The file is transferred to the server at block 940, typically using HTTP or FTP network transport protocols, or another similar way of transferring files from one computer to another via a network. Once the transfer is complete, at block 950 the upload facility may direct a copy of the video file to a video logging application 216, where indexing and metadata extraction is typically performed. Additionally at block 950, another copy of the video file is transferred to a video server or content distribution network 240 to support playback over the network. Finally, at block 960, the metadata index output of the video logging application 216 is sent to the video application server 220, where a new video asset is created. The index information may also be added to the video database, making it available for search or retrieval operations by users of the website.

As described herein, the invention fills the longstanding need in the technology of a system that provides community-oriented websites the capability to achieve their community building goals by exploiting video processing capabilities using rich and interactive media content. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes that come within the meaning and range of equivalency of the claims are to be embraced within their scope.

What is claimed is:

1. A video community system, comprising:
   a repository storing video content comprising a plurality of encoded videos and an index of the video content and being accessible by a plurality of user devices; and
   a video search and retrieval application configured to search the index of the video content based on a user query and return a search result to at least one of the user devices,
   wherein a selected portion of a selected one of the videos is shareable via an offset video pointer communicated to at least one of the user devices, and wherein the selected portion is made shareable according to a user-selected operation, wherein the offset video pointer includes information specifying start and end times of the selected portion.

2. The system as defined in claim 1, wherein the user-selected operation is selected from the following operations:
   sending the offset video pointer in an e-mail message;
   selectively indexing the offset video pointer as a user-identified favorite video;
   placing the offset video pointer in a video chat room; and
   placing the offset video pointer in a video message board.

3. The system as defined in claim 1, wherein the index comprises metadata based on the content of the videos.

4. The system as defined in claim 1, wherein the offset video pointer provides access to the selected portion of the selected video stored on the repository.

5. The system as defined in claim 1, further comprising an uploader configured to upload a video stored on a user device to the repository.

6. The system as defined in claim 1, further comprising a module configured to stream a video identified in the search result to a user device.

7. The system as defined in claim 1, further comprising an encoder configured to receive unencoded video and generate the encoded videos for storage on the repository.

8. The system as defined in claim 7, further comprising the index generator configured to generate an index for the video content, wherein the generation of the index and the generation of the encoded videos are performed in parallel.

9. The system as defined in claim 1, wherein the offset video pointer is a uniform resource locator (URL).

10. The system as defined in claim 1, wherein the offset video pointer is a link to a web page.

11. The system as defined in claim 1, wherein the user query is received by the video search and retrieval application via a web page.

12. The system as defined in claim 1, wherein the offset video pointer provides a link to a video clip, the video clip being a time segment of the selected video, the time segment being defined by at least the start time.

13. The system of claim 12, wherein the offset video pointer is a uniform resource locator (URL) comprising at least the start time of the video clip.

14. The system of claim 12, wherein the offset video pointer comprises playback offsets referring to a time segment that defines the video clip.

15. The system of claim 14, wherein the playback offsets are obtained from the video clip.

16. The system of claim 1, wherein the video search and retrieval application is configured to permit selection of a video from the search result.

17. The system as defined in claim 1, wherein extracted metadata is stored in the index.

18. A video community system, comprising:
   a repository storing video content comprising a plurality of encoded videos and an index of the video content and being accessible by a plurality of user devices; and
   a video search and retrieval application configured to:
   search the index of the video content based on a user query and return a search result to at least one of the user devices; and
   share a selected portion of a selected one of the videos via an offset video pointer communicated to at least one of the user devices according to a user-selected operation, wherein the offset video pointer includes information specifying start and end times of the selected portion.

19. A video community system, comprising:
   means for storing video content comprising a plurality of encoded videos and an index of the video content and being accessible by a plurality of user devices;
   means for searching the index of the video content based on a user query and returning a search result to at least one of the user devices; and
   means for processing, by at least one computing device, a selected portion of a selected one of the videos according to a user-selected operation so as to be shareable via an offset video pointer with at least one other user, wherein the offset video pointer includes information specifying start and end times of the selected portion.

20. A method of sharing video in a video community, comprising:
   storing video content comprising a plurality of encoded videos and an index of the video content and being accessible by a plurality of user devices;
   searching the index of the video content based on a user query and returning a search result to at least one of the user devices; and
   communicating, by at least one computing device, a selected portion of a selected one of the videos according to a user-selected operation so as to be shareable via an offset video pointer communicated to at least one other user device, wherein the offset video pointer includes information specifying start and end times of the selected portion.

21. A video community system, comprising:
   a repository storing video content comprising a plurality of encoded videos and an index of the video content and being accessible by a plurality of user devices;
   a video search and retrieval application configured to search the index of the video content and return a search result to at least one of the user devices; and
   an application configured to select, as a user-identified favorite, a selected portion of a selected one of the videos via a sharable offset video pointer, wherein the offset video pointer includes information specifying start and end times of the selected portion.

22. The system as defined in claim 21, wherein the application is configured to select, as the user-identified favorite, the selected portion of the selected video via the offset video pointer according to a user-selected operation.

23. The system as defined in claim 22, wherein the selected portion is indexed as a favorite in association with a particular user account.

24. The system as defined in claim 21, wherein the application is configured to maintain a list of user-identified favorite videos.

25. The system as defined in claim 24, wherein the application is further configured to access the list of user-identified favorite videos according to one or more of the following user-selected operations:
- select one from the list of user-identified favorite videos for playback;
- change the order of user-identified favorite videos in the list;
- remove one from the list of user-identified favorite videos; and
- share one from the list of user-identified favorite videos via the offset video pointer with another user by sending as an email message, sending as a chat message, posting a message in a board, or posting in a chat room.

26. The system as defined in claim 21, wherein the user-identified favorite is selected from the search result.

27. A video community system, comprising:
- a web-accessible video sharing community configured to offer a plurality of user-selectable operations selected from: email, favorites, video upload, and message board;
- a repository comprising a plurality of videos; and
- a search and retrieval application configured to access the repository and provide a search result according to a query communicated via a web interface on a user device, the search result comprising at least one offset video pointer providing access to a portion of a video stored on the repository, wherein the offset video pointer includes information specifying start and end times of the selected portion, the offset video pointer being sharable with at least one other user.

28. The system as defined in claim 27, wherein the offset video pointer is sharable with at least one other user in response to at least one of the user-selectable operations.

* * * * *